Patented Jan. 17, 1950

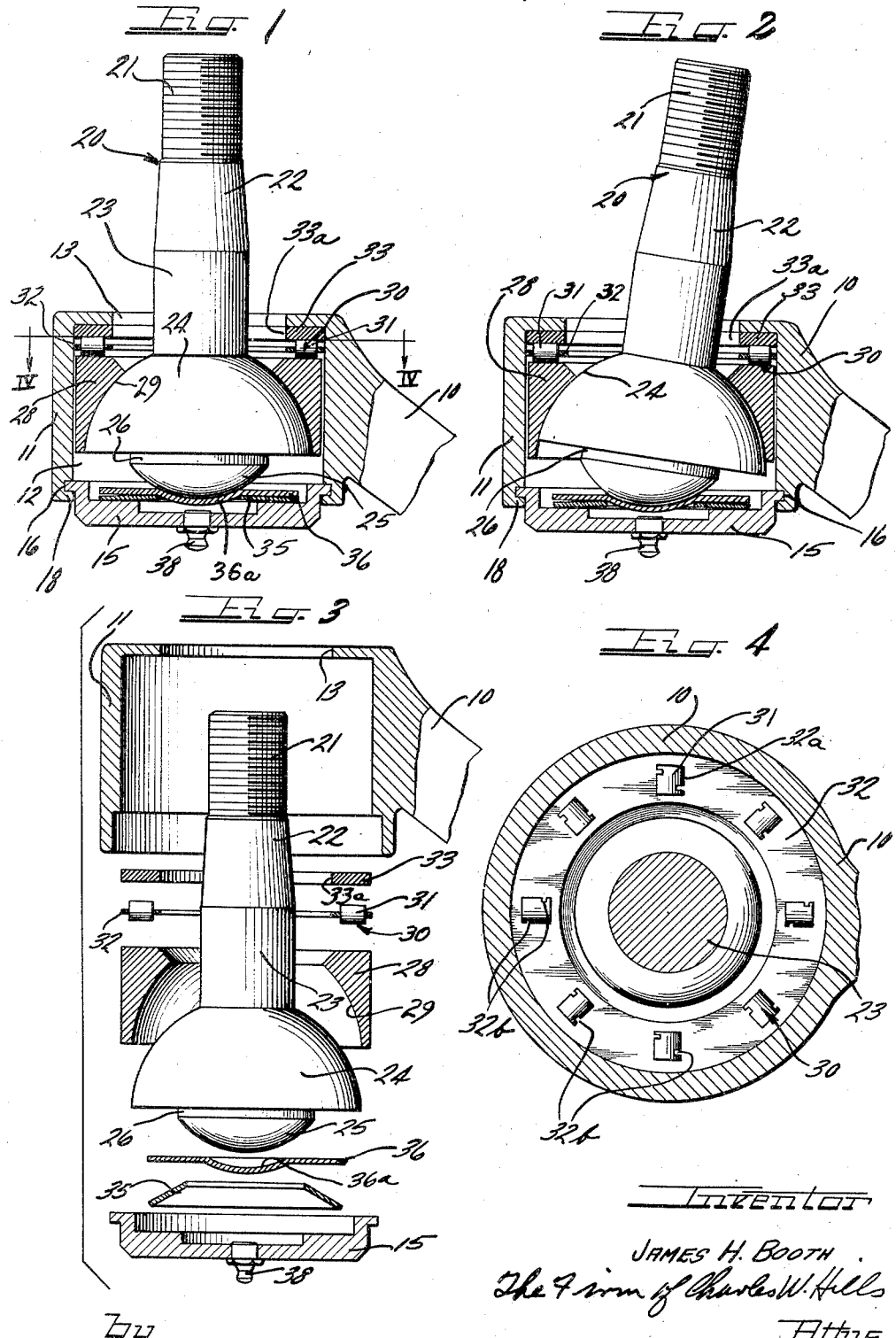

2,494,739

UNITED STATES PATENT OFFICE 2,494,739

BALL JOINT

James H. Booth, Corunna, Mich., assignor to Thompson Products, Inc., Cleveland, Ohio, a corporation of Ohio Application October 24, 1947, Serial No. 781,998

6 Claims. (Cl. 287—90)

This invention relates to joints accommodating relative rotation and relative tilting movement of the parts on separate sets of bearing surfaces.

More particularly this invention relates to joint construction wherein the joint member is rotatably mounted on anti-friction bearings and tiltably mounted on other bearings.

The ball joint of this invention is particularly well adapted for use at the free end of the control arms of an automotive independent front wheel suspension, since it is designed to permit free rotation and tilting of the ball stud in the joint and to simultaneously transmit thrust loads of considerable magnitude through the joint. This ball joint of course is also adapted for use in drag links and tie-rod connections.

According to this invention a housing receives a stud having an end portion comprising two oppositely disposed segmental spherical surfaces. A thrust collar or seat ring fitting loose in the housing seats in self-aligning engagement on the uppermost of the spherical surfaces. The lower spherical surface of the stud is spring pressed upwardly so that the thrust collar is urged into contact with a roller bearing assembly which in turn is held against a hardened thrust washer mounted in the housing. Thus, the roller bearing assembly, using the thrust washer and the collar as upper and lower races respectively, permits free rotation of the stud and thrust collar in the joint. Pivoting of this joint is permitted by the engagement of the upper spherical surface of the stud with the spherical socket portion of the thrust collar.

A feature of this invention is the use of an anti-friction bearing to transmit thrust load from the ball joint housing to a thrust collar having a stud tiltably mounted therein and at the same time to permit free rotation of the stud and thrust collar in the housing.

An object of this invention is to provide an improved joint construction having a universally movable member mounted on an anti-friction bearing assembly and tiltable on a race of the anti-friction bearing.

A further object of this invention is to provide a ball joint structure which includes but a relatively few parts that are easily assembled and are held in a manner permitting free relative oscillation between the stationary members without displacement of the members.

Another object of this invention is to provide a joint having a separate pair of bearing surfaces for tilting and for rotating movement, capable of functioning freely even when bearing heavy loads.

A specific object of this invention is to provide a simple and efficient ball joint structure especially adapted for use in automobiles as a connection between certain coacting parts thereof, such as tie-rods, drag links or in joints of an independent front wheel suspension.

A still further object of this invention is to provide a ball joint having anti-friction bearings wherein the bearings ride on races provided by thrust transmitting members of the joint.

Other and further objects and features of this invention will be apparent to those skilled in the art from the following detailed description of the annexed sheets of drawings which, by way of preferred example only illustrate one embodiment of the invention.

On the drawings:

Figure 1 is a vertical central cross sectional view of a joint housing having parts of bearing surfaces therein according to this invention, and illustrating the pivoting stud in elevation;

Figure 2 is a vertical central cross sectional view similar to that of Fig. 1, showing the ball stud in a tilted position;

Figure 3 is a vertical sectional view showing the parts of the ball joint of this invention in an exploded view; and Figure 4 is a horizontal sectional view taken substantially on line IV—IV of Fig. 1.

In Figure 1 the reference numeral 10 designates generally a control arm of an independently suspended wheel structure. The arm 10 has an inverted end portion 11 defining a cavity or chamber 12 and having an opening 13 at the upper end thereof. The lower open end of the chamber 12 is closed by a plate 15 seated in a groove 16 formed within the housing walls. The plate 15 is held in position by peening or spinning the lower edges of the cup-shaped end portion 11 thereover as indicated at 18.

A ball stud 20 projects through the opening 13 and has a threaded top portion 21, an intermediate tapered portion 22, a cylindrical shank 23 below the tapered portion, an upper segmental spherical bearing portion 24, a cylindrical portion 26 and a lower segmental spherical bearing portion 25 below said cylindrical portion.

Tilting movement of the stud 20 relative to the cup shaped housing portion 11 is provided by a thrust collar 28 which has a socket portion 29 of substantially the same contour as that of the upper spherical portion 24 of the stud 20. The thrust collar has an outer cylindrical surface which is disposed for free rotation in the housing 11. When the thrust collar and the stud are assembled in the ball joint, the stud is tiltable in the thrust collar due to the contact of the segmental spherical surfaces of the members.

Free rotation of the stud is provided by an anti-friction bearing assembly 30 which is positioned between the upper surface of the thrust collar 28 and a hardened thrust ring 33 which abuts against the upper inner surface of the housing and has a central aperture 33a in registry with the opening 13 in the housing.

The anti-friction bearing assembly 30 comprises a plurality of roller bearings 31 held in spaced radial relation by a retainer ring 32. As shown in Figure 4, the rollers are positioned in openings 32a of the retainer ring 32, which openings are slightly smaller in width than the diameter of the rollers to prevent the rollers from falling therethrough. Tab portions 32b, turned up from the retainer ring 32, are bent over the top of the rollers to hold them in place.

The various elements of this ball joint are held together in the chamber 12 by a spring washer 35 which is compressed between the closure plate 15 and a spring seat member 36 which has a socket portion 36a adapted to receive the spherical lower end of the stud 20.

In Fig. 3 the spring washer 35 is shown in an unloaded position, while Fig. 1 illustrates the depressed spring as assembled in the ball joint.

A grease fitting 38 is arranged in the closure plate 15 to afford means for greasing the joint.

From the foregoing description it is seen that there is provided by this invention a ball joint in which a stud is arranged to rotate freely on anti-friction bearings and to tilt relative to the housing of the joint in a spherical shaped socket member mounted in the housing.

In Fig. 2 is illustrated the ball joint 20 in a pivoted position. The relative movement of the spherical surface of the portion 24 of the stud and the socket portion of the thrust collar 28 is clearly shown.

It will of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint structure comprising a housing, a stud having an end portion disposed in said housing, a thrust ring disposed about said stud in pivoting relation therewith, a thrust plate disposed in said housing around said stud and a roller bearing assembly disposed between said thrust ring and said thrust plate, said stud being arranged to transmit a thrust load only to said housing.

2. A joint structure comprising a housing, a stud having an end portion with a segmental spherical bearing surface disposed in said housing, a thrust ring around said stud and pivotable on the spherical bearing surface of said stud, a cylindrical thrust plate disposed in said housing around said stud, and a plurality of roller bearing elements disposed between said thrust ring and said thrust plate, said thrust ring being disposed entirely below said roller elements to exert a thrust load only thereagainst.

3. A joint structure comprising a housing, a stud having an end portion comprising a pair of segmental spherical bearing surfaces, a thrust ring disposed about said stud in pivoting relation on one of said spherical surfaces, a thrust plate disposed in said housing around said stud, a roller bearing assembly disposed between said thrust ring and said thrust plate and means acting on the lower segmental spherical surface of said stud for urging said stud upwardly against said thrust ring and for positioning said roller bearing assembly and said thrust plate in operating position.

4. A joint structure comprising a housing having a cavity therein and an end wall with a central aperture, a stud with an end portion comprising a pair of segmental spherical bearing surfaces, the shank of said stud extending through the central aperture of said housing, a thrust collar disposed about said stud against the end wall of said housing, a thrust ring positioned in the cavity of said housing and having a central bearing surface in contact with one of said bearing surfaces of said stud, a plurality of roller bearings disposed between said thrust ring and said thrust collar and a spring washer acting on the lower end of said stud for urging said stud upwardly against said thrust ring and to position said roller bearings and said thrust collar in operating position, the entire thrust load on said stud being transmitted through said thrust collar to the end wall of said housing.

5. A joint structure comprising a housing having a cylindrical cavity, a stud with an end portion having a segmental spherical bearing surface positioned in said cavity, a roller bearing assembly disposed between said stud and said housing and rotatable in races in a plane substantially perpendicular to the central longitudinal axis of the joint, one of the races of said bearing assembly having an outer surface of substantially the same contour as that of the spherical bearing surface of said stud, said stud being associated therewith for pivoting away from the central longitudinal axis of the joint and the other of said races of said roller bearing having a cylindrical contour for closely contacting the walls of the cylindrical cavity of said housing.

6. A joint comprising a stud having a head, a seat ring receiving the stud therethrough and tiltably supporting said head, a housing loosely receiving said ring, and anti-friction thrust bearings between the ring and housing, a retainer ring for said bearings slidably guided by said housing to maintain the bearings in position, and a spring acting on said stud to urge the stud head into the ring, to urge the ring against the bearings and to urge the bearings into thrust relation with the housing.

JAMES H. BOOTH.

REFERENCES CITED

The following references are of record in the file of this patent:

UNITED STATES PATENTS

| Number | Name | Date |
| --- | --- | --- |
| 2,037,786 | Hufferd | Apr. 21, 1936 |
| 2,048,803 | Marles | July 28, 1936 |